(12) United States Patent
Decker et al.

(10) Patent No.: US 11,047,498 B2
(45) Date of Patent: Jun. 29, 2021

(54) SEAL-LESS VALVES

(75) Inventors: Gifford Decker, Springville, UT (US); Varadharajen Lakshamanan, Kernataka (IN); Fred Cain, Orem, UT (US)

(73) Assignee: FLOWSERVE MANAGEMENT COMPANY, Irving, TX (US)

( * ) Notice: Subject to any disclaimer, the term of this patent is extended or adjusted under 35 U.S.C. 154(b) by 255 days.

(21) Appl. No.: 13/279,103

(22) Filed: Oct. 21, 2011

(65) Prior Publication Data

US 2012/0097873 A1 Apr. 26, 2012

Related U.S. Application Data

(60) Provisional application No. 61/406,090, filed on Oct. 22, 2010.

(51) Int. Cl.
*F16K 31/04* (2006.01)
*F16K 31/08* (2006.01)

(52) U.S. Cl.
CPC ............ *F16K 31/04* (2013.01); *F16K 31/088* (2013.01)

(58) Field of Classification Search
CPC ........ F16K 31/06; F16K 31/08; F16K 31/086; F16K 31/088; F16K 31/04; H01F 7/0242; H01F 7/0231
USPC ............................................. 251/65, 129.11
See application file for complete search history.

(56) References Cited

U.S. PATENT DOCUMENTS

| | | | |
|---|---|---|---|
| 3,347,262 A * | 10/1967 | Gibson | 137/375 |
| 3,908,959 A * | 9/1975 | Fichtner | 251/129.11 |
| 4,327,892 A * | 5/1982 | Ruyak | 251/65 |
| 4,384,703 A * | 5/1983 | Ruyak et al. | 251/65 |
| 4,671,486 A * | 6/1987 | Giannini | 251/65 |
| 5,364,066 A * | 11/1994 | Dorste et al. | 251/122 |
| 5,372,351 A * | 12/1994 | Oliver | 251/65 |
| 5,611,368 A | 3/1997 | Hwang et al. | |
| 6,997,430 B2 * | 2/2006 | Denning et al. | 251/71 |
| 8,297,315 B2 * | 10/2012 | Esveldt | 137/625.3 |
| 2005/0206260 A1 * | 9/2005 | Akiyama | C30B 15/30 310/104 |
| 2008/0073606 A1 * | 3/2008 | Liantonio | 251/65 |
| 2008/0157014 A1 | 7/2008 | Vick, Jr. et al. | |

FOREIGN PATENT DOCUMENTS

| | | | | |
|---|---|---|---|---|
| GB | 2457226 A | * | 8/2009 | H02K 49/102 |
| JP | 06-307573 A | | 11/1994 | |
| JP | 2005-180535 A | | 7/2005 | |
| KR | 10-1995-0033211 A | | 12/1995 | |

OTHER PUBLICATIONS

PCT International Search Report and Written Opinion from corresponding Application No. PCT/US2011/057373, dated Jun. 26, 2012.

* cited by examiner

*Primary Examiner* — Mary E McManmon
*Assistant Examiner* — Andrew J Rost
(74) *Attorney, Agent, or Firm* — Phillips Winchester

(57) ABSTRACT

A valve assembly including a valve body, an outer housing having rotating shaft containing magnets and being driven by a motor, an inner housing statically sealed to the valve body, and an actuation system enclosed within the inner housing, the actuation system having magnets that are induced by magnetic field created by the rotating shaft magnets.

12 Claims, 3 Drawing Sheets

SEAL-LESS VALVES

CROSS-REFERENCE TO RELATED APPLICATION

This application claims the benefit of U.S. Provisional Patent Application Ser. No. 61/406,090, filed Oct. 22, 2010, the disclosure of which is hereby incorporated herein in its entirety by this reference.

TECHNICAL FIELD

The present invention relates generally to control valves. More particularly, embodiments of the present invention relate to control valves comprising a seal-less, leak-free control valve.

BACKGROUND

Typical control valves require a dynamic seal between the fluid containment area and the outside atmosphere (e.g., a seal the area between the fluid flow path and the chamber on the top of a plug head). In many applications, the seals that are generally used expand and shrink at a rate many times that of the metal parts around it. As a result, the seal will leak when the plug is on the seat (valve is shut), during the dynamic action of the valve, and during operation. Some applications require leakage levels to be very low when the valve is shut. Outer diameter seals by themselves are not capable of getting very low levels of leakage.

In the oil and gas industry, the concentration of $H_2S$ in hydrocarbons is increasing significantly with the shift to the production of more 'difficult' oil and gas fields. Inherently leak-free valves, which are not yet available to the oil and gas industry, are needed for the safer and more efficient production of sour oil and gas.

A main trend in the industry is the exploitation of more challenging fields with high $H_2S$ concentrations and high pressures. The current world reserves of sour gas are estimated at 4400 Tscf, of which 50% contain more than 15% contaminants. An example of an extremely sour field will operate with pressures up to 800 bar and having a starting $H_2S$ concentration of about 20%. Additionally, the worldwide implementation of tighter regulations, including penalties related to fugitive emissions, creates regulatory demands. It is estimated that about two thirds of the fugitive emissions originates from valves. Thus, exploration operations would benefit greatly by the availability of leak-free valve technology.

SUMMARY OF THE INVENTION

The present disclosure includes embodiments that resolve many of the issues found in the art of control valve design. Specifically, embodiments are described for valve controls and valve assemblies that reduce fugitive emissions and lessen leakage levels. Generally, the embodiments described herein include a method, system, and apparatus for a valve assembly.

In one embodiment, the valve assembly includes a valve body; an outer housing having rotating shaft containing magnets, wherein the outside housing is driven by a motor; an inner housing statically sealed to the valve body; an actuation system enclosed within the inner housing, the actuation system having magnets that are induced by magnetic field created by the rotating shaft magnets.

In further embodiments, the valve body may include a sliding stem. In another embodiment, the valve body may include a rotary stem. In one embodiment, the valve body comprises an integrated, statically sealed bonnet and a stem coupler. In a further embodiment, the actuation system comprises a rotary-to-linear device. In yet a further embodiment, the actuation system comprises a rotary device.

In one embodiment, the valve assembly comprises a control valve, on-off valve, or rotary valve assembly. In one embodiment, the rotating shaft of the outer housing is in contact with a motor. In a further embodiment, a gear box is disposed between the rotating shaft and the motor. In one embodiment, the rotating shaft includes an outer magnetic rotor. In a further embodiment, the outer magnetic rotor comprises a solid rotor, or a radial disc connected to a ring-shaped outer magnetic rotor ring. In a further embodiment, the at least one outer magnet comprises a plurality of evenly circumferentially-spaced individual magnet elements. In yet a further embodiment, the at least one outer magnet is located on the inside face of the outer rotor.

In one embodiment, the at least one inner magnet is disposed within an alloy housing. In another embodiment, the at least one inner magnet comprises a plurality of evenly circumferentially spaced individual magnet elements. In some embodiments, the at least one inner magnet faces the outer magnet. In some embodiments, the valve assembly includes a valve closure element in communication with the actuation system.

In a certain embodiment, the valve assembly includes a valve body; an outer housing having rotating shaft containing at least one outer magnet, wherein the outside housing is driven by a motor; an inner housing statically sealed to the valve body; an actuation system enclosed within the inner housing, the actuation system having at least one inner magnet that is induced by magnetic field created by the rotating shaft magnets; and a gear box disposed between the rotating shaft and the motor.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

In the following detailed description, reference is made to the accompanying drawings, which form a part hereof, and in which is shown, by way of illustration, specific embodiments in which the invention may be practiced. These embodiments are described in sufficient detail to enable a person of ordinary skill in the art to practice the invention. However, other embodiments may be utilized, and structural, logical, and electrical changes may be made without departing from the scope of the invention. The illustrations presented herein are not meant to be actual views of any particular device or system, but are merely idealized representations that are employed to describe embodiments of the present disclosure. The drawings presented herein are not necessarily drawn to scale. Additionally, elements common between drawings may retain the same or have similar numerical designations.

The illustrations presented herein are, in some instances, not actual views of any particular cutting element insert, cutting element, or drill bit, but are merely idealized representations which are employed to describe the present invention. Additionally, elements common between figures may retain the same numerical designation.

As used herein, "leak-free valve" or "seal-less valve" means a valve with no dynamically loaded seals towards the external environment. A seal-less valve throttles or switches a fluid flow like any other valve would, but is characterized in having zero potential leak paths to the outside atmosphere, by design and by concept. Potential leak path elimination dictates that sliding or rotating seals (dynamically loaded seals) between the fluid containment area and the outside atmosphere are to be eliminated.

A particular embodiment of the present invention includes a rotating armature that is completely sealed and separated from operating fluid by packing is driven with magnetic force. The application includes operation of the armature in a manner that is non-continuous as is the mixer and pump operation. With regard to control valves, the operation must be able to reverse and position for control and provide sufficient linear force to enable valve shut-off.

Figure 1:
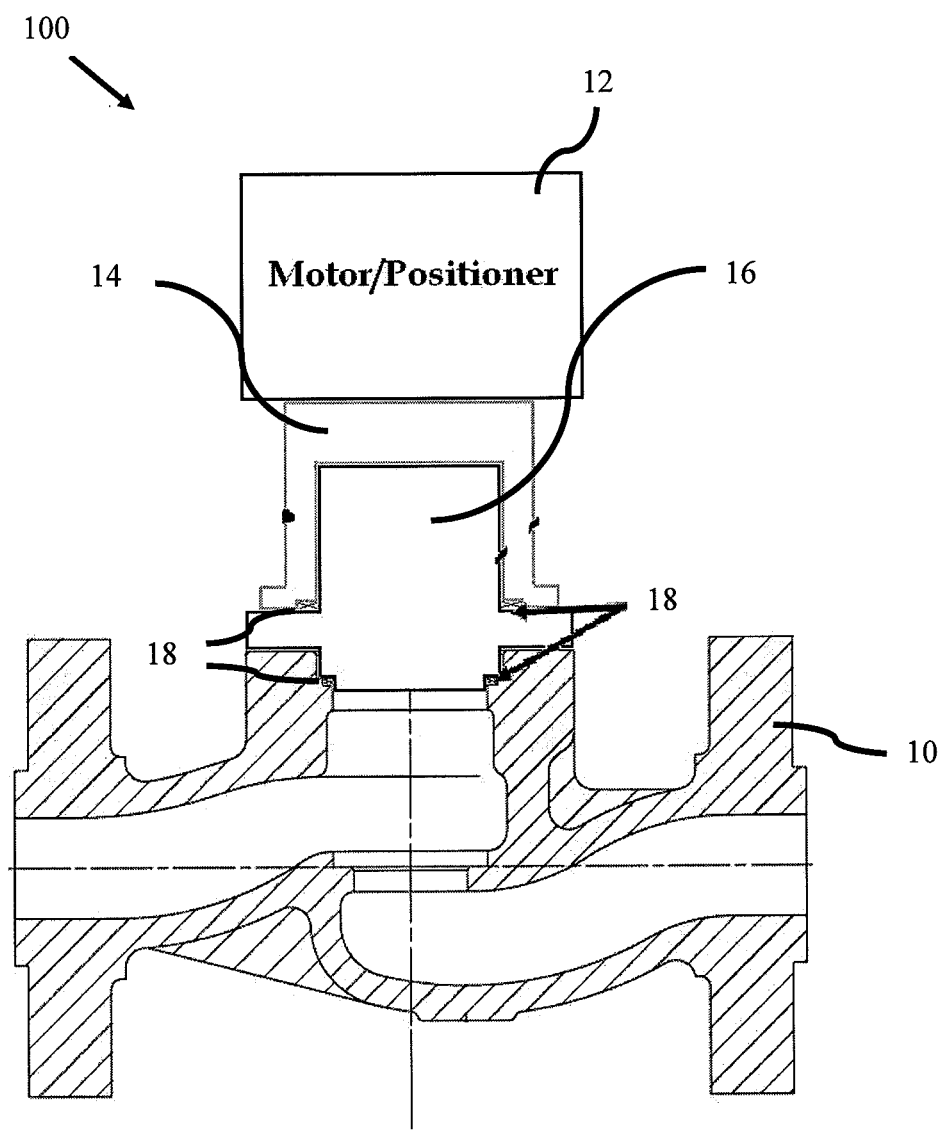
FIG. 1 illustrates a cross-section of a valve assembly according to at least one embodiment.

Referring to FIG. 1, an embodiment of a valve assembly 100 in accordance with the present invention includes a control valve body 10 with either sliding stem or rotary stem 29 having an integrated, statically sealed bonnet and stem coupler, and magnetic drive technology. A motor/positioned 12 may be included that is attached to the drive system 14. The drive system 14 is completely isolated from the containment system 16. The containment system 16 includes a valve closure element (e.g., a plug) and rotary or linear actuation system as discussed below. In particular embodiments, position feedback and diagnostics may require one sealed penetration for communication. In the depicted embodiment static seals 18 are providing between the drive system 14 and the containment system 16, and between the containment system 16 and the valve body 10. In one embodiment, a magnetic force is generated by the drive system 14 and passed electromagnetically to the containment system 16 to actuate a valve plug 30 (FIG. 2).

Figure 2:
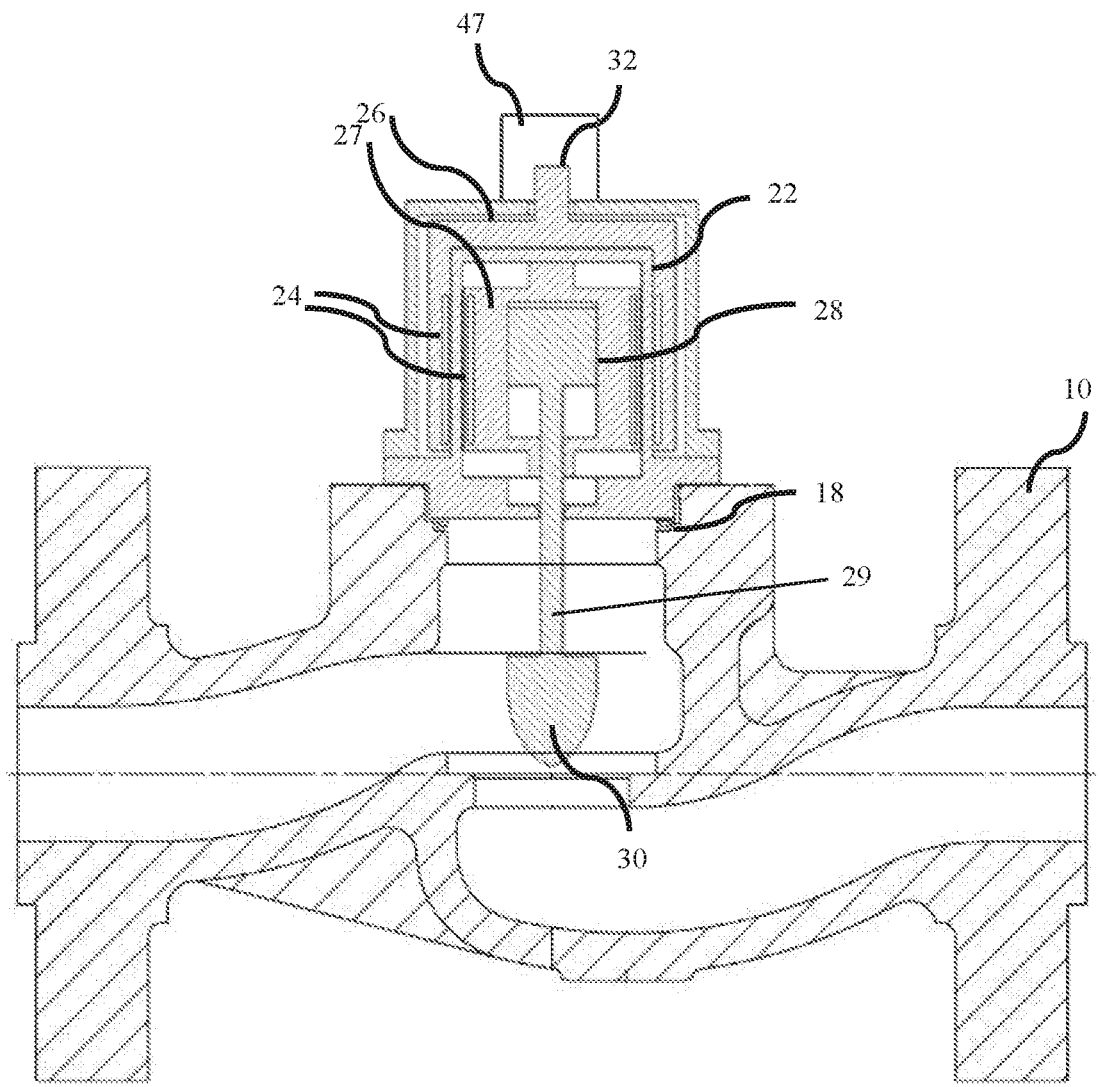
FIG. 2 illustrates a magnified cross-section view of a valve assembly according to at least one embodiment, showing details of the alloy housing and enclosure components.
Figure 3:
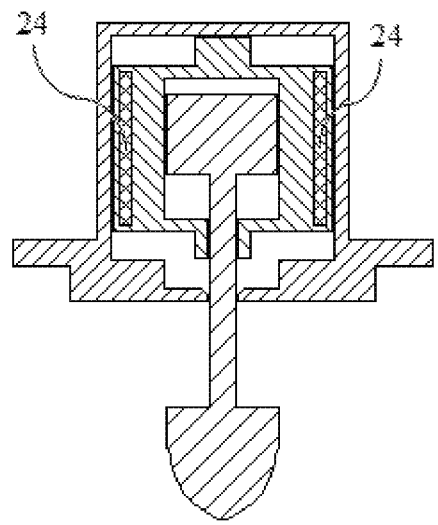
FIG. 3 illustrates a cross-section of the alloy housing according to an embodiment.
Figure 4:
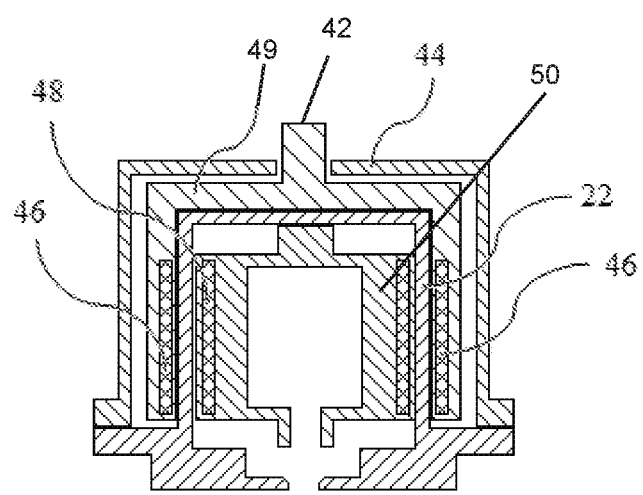
FIG. 4 illustrates a cross-section of the housing according to an embodiment.

Referring to FIGS. 2 and 3, actuation is completely enclosed in an alloy housing 22 that is statically sealed to the valve body 10 using a static seal 18 (e.g., via a gasket o-ring). The actuation components can include a rotary-to-linear device 28 (e.g., a rotating outer screw that drives a screw attached to a plug to create linear motion) or a rotary device, bearings, packing, and, optionally, potting fluid to protect the actuation components. The rotary motion is induced by magnetic field created by similar magnets 24 rotating outside the housing 22 (e.g., through an outer magnetic rotor 26), as also illustrated in FIG. 4. For example, one or more magnets 24 may be housed in the alloy housing 22 and one or more magnets 24 may be housed outside the alloy housing 22. Magnetic energy may be passed from magnets 24 outside the alloy housing 22 to magnets 24 inside the alloy housing 22 to drive a rotating member. In at least one embodiment, a rotating part 26 may be included outside the alloy housing 22 and a corresponding rotating part 27 may be included inside the alloy housing 22. As the external rotating part 26 rotates, energy may be transferred magnetically to cause the internal rotating part 27 to rotate. In this manner the valve may be operated using only static seals 18 to separate the interior liquid flow from external rotating parts 26. In at least one embodiment, a shaft 32 may be provided for attachment to a motor 12.

It is understood that the present invention can be applied to numerous valve systems, such as control valves, on-off valves, rotary valves, etc., through adaptation of rotary or rotary-to-linear actuation devices. With respect to on/off valves, application in such systems would require use of a reversible stepper motor, but no positioned.

As illustrated in FIG. 4, on the housing is a rotating shaft 42 that contains magnets 24. This shaft 42 can be driven by a type of motor 12 that can be positioned and reversed to allow for control of the process fluid (e.g., Servo stepper motor). The outside rotating shaft 42 is protected inside a housing 44 that can be removed for maintenance of the driving shaft 42 without exposing the process fluid to atmosphere.

The valve system includes a motor 12 (e.g., an electrically driven motor) that can be connected to a rotating shaft 42 that contains magnets 46. A gear box system, which can include a gear reducer having a predetermined ratio, can be disposed between the rotating shaft 42 and the motor 12. The rotating shaft 42 includes an outer magnetic rotor 49. The outer magnetic rotor 49 can include any suitable shape or form, such as a solid rotor, or a radial disc which is connected to a ring shaped outer magnetic rotor ring, or any other suitable design capable of supporting magnets. In one embodiment, the outer magnets 46 can be located on the inside face of the outer rotor 49. The outer magnets 46 may be a plurality of evenly circumferentially spaced individual magnet elements and can be attached to the magnet rotor by being bonded, glued, or otherwise retained.

As illustrated, one or more inner magnets 48 are disposed within an alloy housing 22. The inner magnets 48 may include a magnetic arrangement, which may be a plurality of individual circumferentially spaced outward facing magnets 48 mounted to the actuation component 50 (rotary device or rotary-to-linear device). The magnets 48 also may be mounted by being bounded, glued, or otherwise attached.

The inner magnets 48 may be sized to have a relatively close clearance gap with the inside of the alloy housing 22, and the outer magnetic rotor 49 may be sized to have a relatively close clearance with the outside of the alloy housing 22, so that a magnetic field can pass through the alloy housing 22 and so that rotation of the outer magnetic rotor 49 causes rotation of the actuation component to provide a magnetic drive and move the valve closure element.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and equivalents, of the claims which follow.

What is claimed is:

1. A valve assembly, comprising:
    a valve body comprising a stem;
    an outer housing having a rotating shaft disposed therein, the rotating shaft including an outer magnetic rotor comprising a solid rotor, or a radial disc connected to a ring-shaped outer magnetic rotor ring, wherein the rotating shaft is driven by a motor;
    a single piece inner housing, that does not comprise a fluid passageway therethrough, having a portion surrounding and extending adjacent to the stem and configured to allow rotary motion of the stem, the inner housing statically sealed to the valve body by a ring seal engaging an outer surface of the inner housing and a surface of the valve body, and the outer housing statically sealed to the inner housing, the inner housing extending within the outer housing; and
    an actuation system substantially enclosed on all sides within the inner housing by the inner housing, the actuation system having magnets that are induced by magnetic field created by the magnets of the rotating shaft, the actuation system in communication with the stem, the stem having a valve closure element located at an end of the stem opposite the actuation system, the stem and the valve closure element being coaxial with the rotating shaft.

2. The valve assembly of claim 1, wherein the stem is a rotary stem.

3. The valve assembly of claim 1, wherein the valve body comprises an integrated, statically sealed bonnet coupled to the stem.

4. The valve assembly of claim 1, wherein the actuation system comprises a rotary device.

5. The valve assembly of claim 1, wherein the valve assembly comprises a control valve, on-off valve, or rotary valve assembly.

6. The valve assembly of claim 1, wherein the rotating shaft is in contact with the motor.

7. The valve assembly of claim 6, further comprising a gear box disposed between the rotating shaft and the motor.

8. The valve assembly of claim 1, wherein at least one inner magnet is disposed within the inner housing, and the inner housing comprises an alloy housing.

9. The valve assembly of claim 8, wherein the at least one inner magnet comprises a plurality of evenly circumferentially spaced individual magnet elements.

10. The valve assembly of claim 8, wherein the at least one inner magnet faces an outer magnet on the rotating shaft.

11. A valve assembly, comprising:
    a valve body comprising a stem;
    an outer housing having a rotating shaft disposed therein, the rotating shaft containing at least one outer magnetic rotor comprising a plurality of evenly circumferentially-spaced individual magnet elements, wherein the rotating shaft is driven by a motor;
    a single piece inner housing, that does not comprise a fluid passageway therethrough, having a portion surrounding and extending adjacent to the stem and configured to allow rotary motion of the stem, the inner housing statically sealed to the valve body by a ring seal engaging an outer surface of the inner housing and a surface of the valve body, and the outer housing statically sealed to the inner housing, the inner housing extending within the outer housing;
    an actuation system substantially enclosed on all sides within the inner housing by the inner housing, the actuation system surrounded laterally by the outer housing, the actuation system having at least one inner magnet that is induced by magnetic field created by the at least one outer magnet of the rotating shaft, the actuation system being in communication with the stem, the stem having a closure element located at an end of the stem opposite the actuation system, the stem and the valve closure element being coaxial with the rotating shaft; and
    a gear box disposed between the rotating shaft and the motor.

12. A valve assembly, comprising:
    a valve body having an integrated, statically sealed bonnet coupled to a stem;
    an outer housing having a rotating shaft disposed therein, the rotating shaft containing at least one outer magnet, wherein the rotating shaft is driven by a motor, wherein the rotating shaft includes an outer magnetic rotor, wherein at least one outer magnet is located on an inside face of the outer magnetic rotor;
    a single piece inner housing, that does not comprise a fluid passageway therethrough, having a portion surrounding and extending adjacent to the stem and configured to allow rotary motion of the stem, the inner housing statically sealed to the valve body by a ring seal engaging an outer surface of the inner housing and a surface of the valve body, and the outer housing statically sealed to the inner housing, the inner housing extending within the outer housing, the at least one outer magnet of the rotating shaft located annularly between the inner housing and the outer housing;
    an actuation system substantially enclosed on all sides within the inner housing by the inner housing, the actuation system surrounded laterally by the outer housing, the actuation system having at least one inner magnet that is induced by magnetic field created by the at least one outer magnet of the rotating shaft, the actuation system being in communication with the stem, the stem having a closure element located at an end of the stem opposite the actuation system, the stem and the valve closure element being coaxial with the rotating shaft; and a gear box disposed between the rotating shaft and the motor.

\* \* \* \* \*